United States Patent [19]

Boyko

[11] Patent Number: 5,431,547
[45] Date of Patent: Jul. 11, 1995

[54] LIQUID REFRIGERANT PUMP

[75] Inventor: James Boyko, Gorham, Me.

[73] Assignee: Phoenix Refrigeration Systems, Inc., Conyers, Ga.

[21] Appl. No.: 132,103

[22] Filed: Oct. 5, 1993

[51] Int. Cl.6 .............................................. F04B 39/06
[52] U.S. Cl. ...................................... 417/366; 62/505
[58] Field of Search ..................... 417/423.3, 366; 62/DIG. 2, 7, 467, 498, 504, 509, 512, 505

[56] References Cited

U.S. PATENT DOCUMENTS

| | | | |
|---|---|---|---|
| 2,793,506 | 5/1957 | Moody | 62/505 |
| 2,949,750 | 8/1960 | Kramer | 62/196.1 |
| 3,006,162 | 10/1961 | Massa | 62/505 |
| 3,081,606 | 3/1963 | Brose et al. | 62/DIG. 2 |
| 3,306,074 | 2/1967 | Wilson | 62/505 |
| 3,618,337 | 11/1971 | Mount | 417/366 |
| 3,666,381 | 5/1972 | Ulm et al. | 417/423.3 |
| 3,805,101 | 4/1974 | Purman | 62/505 |
| 3,805,547 | 4/1974 | Eber | 62/505 |
| 3,823,568 | 7/1974 | Dijasiewicz et al. | 62/7 |
| 4,045,974 | 9/1977 | McCarty | 62/505 |
| 4,096,706 | 6/1978 | Beckwith | 62/115 |
| 4,123,919 | 11/1978 | Fehlhaber | 62/DIG. 2 |
| 4,182,137 | 1/1980 | Erth | 62/505 |
| 4,275,319 | 6/1981 | Davis, Jr. | 417/423.3 |
| 4,586,877 | 5/1986 | Watanabe et al. | 417/423.3 |
| 4,599,873 | 7/1986 | Hyde | 62/498 |
| 5,129,796 | 7/1992 | Emmert et al. | 417/423.3 |
| 5,150,580 | 9/1992 | Hyde | 62/86 |
| 5,173,037 | 12/1992 | Martin et al. | 417/423.3 |
| 5,224,845 | 7/1993 | Mangyo et al. | 417/423.13 |
| 5,295,808 | 3/1994 | Machida et al. | 417/366 |

OTHER PUBLICATIONS

"Compatibility of Refrigerants and Lubricants with Motor Materials", By Robert Doerr, Ph.D and Stephen Kujak, ASHRAE Journal, Aug. 1993, pp. 42–47.

Primary Examiner—Richard A. Bertsch
Assistant Examiner—Peter Korytnyk
Attorney, Agent, or Firm—Bliss McGlynn

[57] ABSTRACT

A liquid refrigerant pump includes a housing having a hollow interior for receiving liquid refrigerant, a motor disposed within the interior of the housing and connected to a source of power, a rotatable pump member disposed within the interior of the housing and a shaft interconnecting the motor and pump member for rotating the pump member to increase the pressure of the liquid refrigerant upon the motor receiving electrical power.

10 Claims, 2 Drawing Sheets

LIQUID REFRIGERANT PUMP

BACKGROUND OF THE INVENTION

1. Field of the Invention

The present invention relates generally to refrigeration systems and, more particularly, to a liquid pump for a refrigeration system.

2. Description of the Related Art

A typical refrigeration system utilizes a control valve, commonly called an "Expansion valve", to meter the flow of liquid refrigerant to an evaporator of the refrigeration system. Sometimes, conditions exist which may cause vapor (commonly called flashgas) to form in the refrigerant feeding the expansion valve. These conditions may arise from either (1) a drop in pressure, due to piping pressure drop or rise in elevation, or (2) an increase in refrigerant temperature, due to heat transfer from ambient surroundings. Since the expansion valve is specifically designed to handle liquid refrigerant only, the presence of flashgas may interfere with the proper operation of the expansion valve.

A liquid pump can be used to slightly elevate the pressure of the refrigerant which feeds the expansion valve, and subsequently eliminate the formation of flashgas. Conventional centrifugal pumps are generally not suitable for this application. These conventional pumps consist of an impeller which is located in a housing and powered by a drive shaft which penetrates the housing. This arrangement requires a seal between the rotating shaft and the stationary housing, and thus provides a potential leakage of refrigerant from the refrigeration system.

Currently, there are two liquid pumps which eliminate the above seal. One liquid pump uses a magnetic clutch to drive a pump impeller with a conventional motor. The other pump incorporates a special motor which uses a thin metallic membrane to isolate the motor windings from the refrigerant. The operation of both pumps causes a magnetic field to rotate through a stationary metallic barrier, resulting in an energy loss due to eddy currents in the barrier. Also, both pumps have a high manufacturing cost, in comparison, to a conventional pump.

SUMMARY OF THE INVENTION

It is, therefore, one object of the present invention to provide a liquid refrigerant pump for a refrigeration system.

It is another object of the present invention to provide a liquid refrigerant pump having a motor submerged in liquid refrigerant.

It is yet another object of the present invention to provide a liquid refrigerant pump which is less expensive and more efficient for refrigeration systems.

It is a further object of the present invention to provide a liquid refrigerant pump which eliminates the need for a magnetic seal between the stator and rotor.

To achieve the foregoing objects, the present invention is a liquid refrigerant pump including a housing, having a hollow interior for receiving liquid refrigerant and a motor disposed within the interior of the housing and connected to a source of power. The liquid refrigerant pump also includes a rotatable pump member disposed within the interior of the housing and means interconnecting the motor and pump member for rotating the pump member to increase the pressure of the liquid refrigerant upon the motor receiving electrical power, whereby the motor, interconnecting means and pump member are submersed in liquid refrigerant in the housing.

One advantage of the present invention is that a liquid refrigerant pump is provided for a refrigeration system. Another advantage of the present invention is that the liquid refrigerant pump has a motor submerged in the liquid refrigerant. Yet another advantage of the present invention is that no magnetic seal is required between the rotor and stator. Still another advantage of the present invention is that the liquid refrigerant pump is hermetically sealed. A further advantage of the present invention is that the liquid refrigerant pump is less expensive and more efficient for refrigeration systems than conventional pumps.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
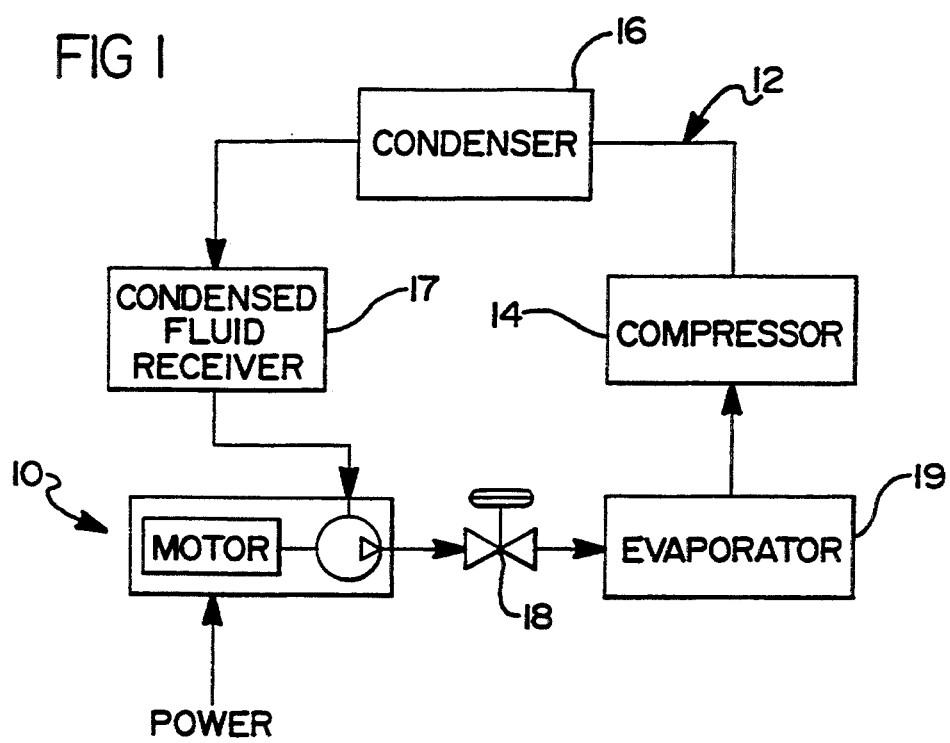
FIG. 1 is a schematic diagram of a liquid refrigerant pump, according to the present invention, illustrated in operational relationship with a known refrigeration system.

Referring to FIG. 1, a liquid refrigerant pump 10, according to the present invention, is shown in operational relationship to a known refrigeration system, generally indicated at 12. The refrigeration system 12 includes a compressor 14 for compressing vapor refrigerant, a condenser 16 connected to the compressor 14 for liquefying the compressed refrigerant, and a receiver 17 connected to the condenser 16 for receiving the liquid refrigerant. The refrigeration system 12 has an outlet of the receiver 17 connected to the liquid refrigerant pump 10 which pressurizes the liquid refrigerant, for example, by approximately eighteen (18) PSI. The refrigeration system 12 also includes an expansion valve 18 connected to the outlet of the liquid refrigerant pump 10 for allowing the liquid refrigerant to expand into a vapor and an evaporator 19 interconnecting the expansion valve 18 and compressor 14 for receiving the vapor refrigerant and allowing heat transfer therein. It should be appreciated that the refrigeration system 10 is conventional and known in the art.

Figure 2:
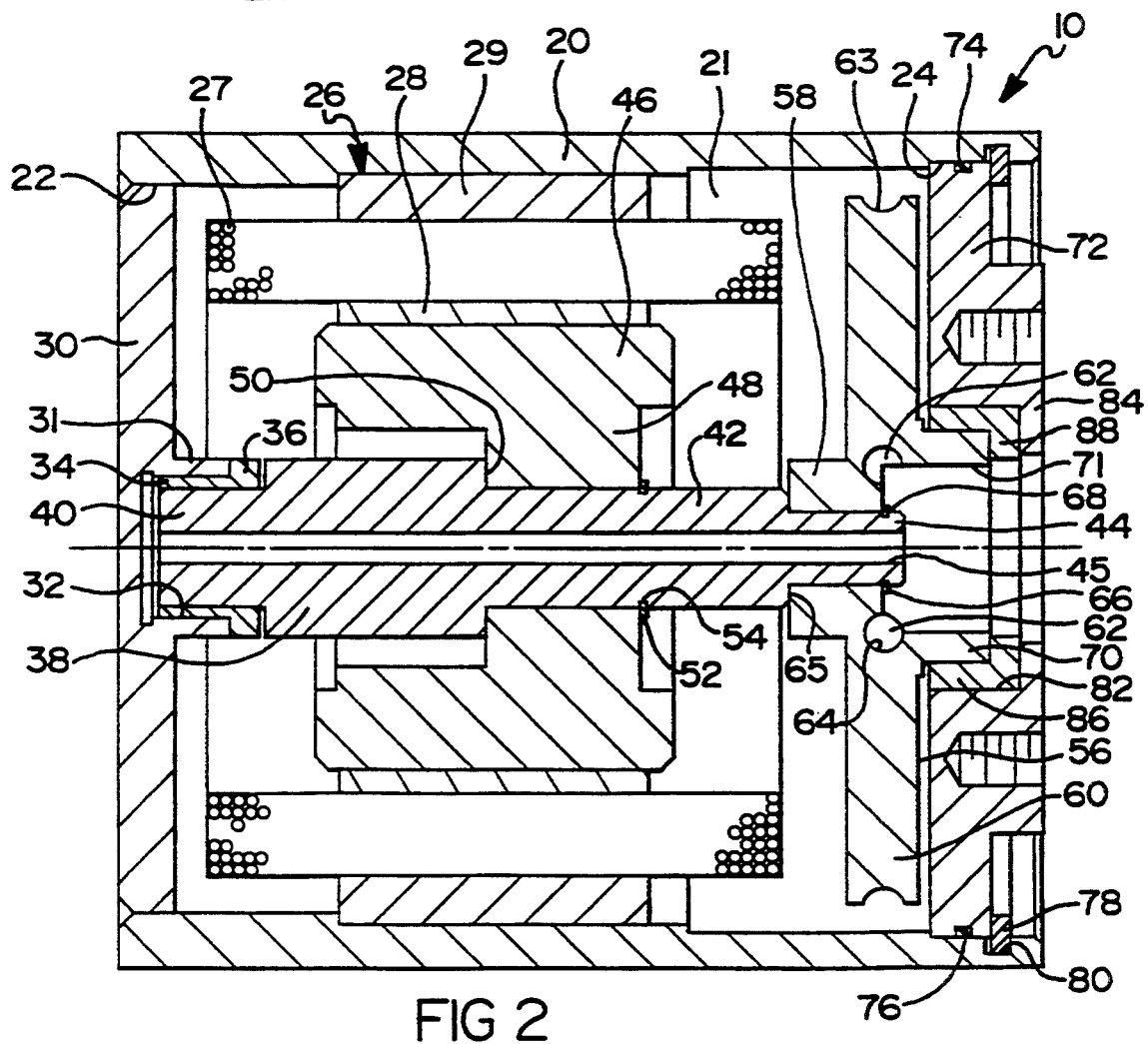
FIG. 2 is a sectional view of the liquid refrigerant pump of FIG. 1.
Figure 3:
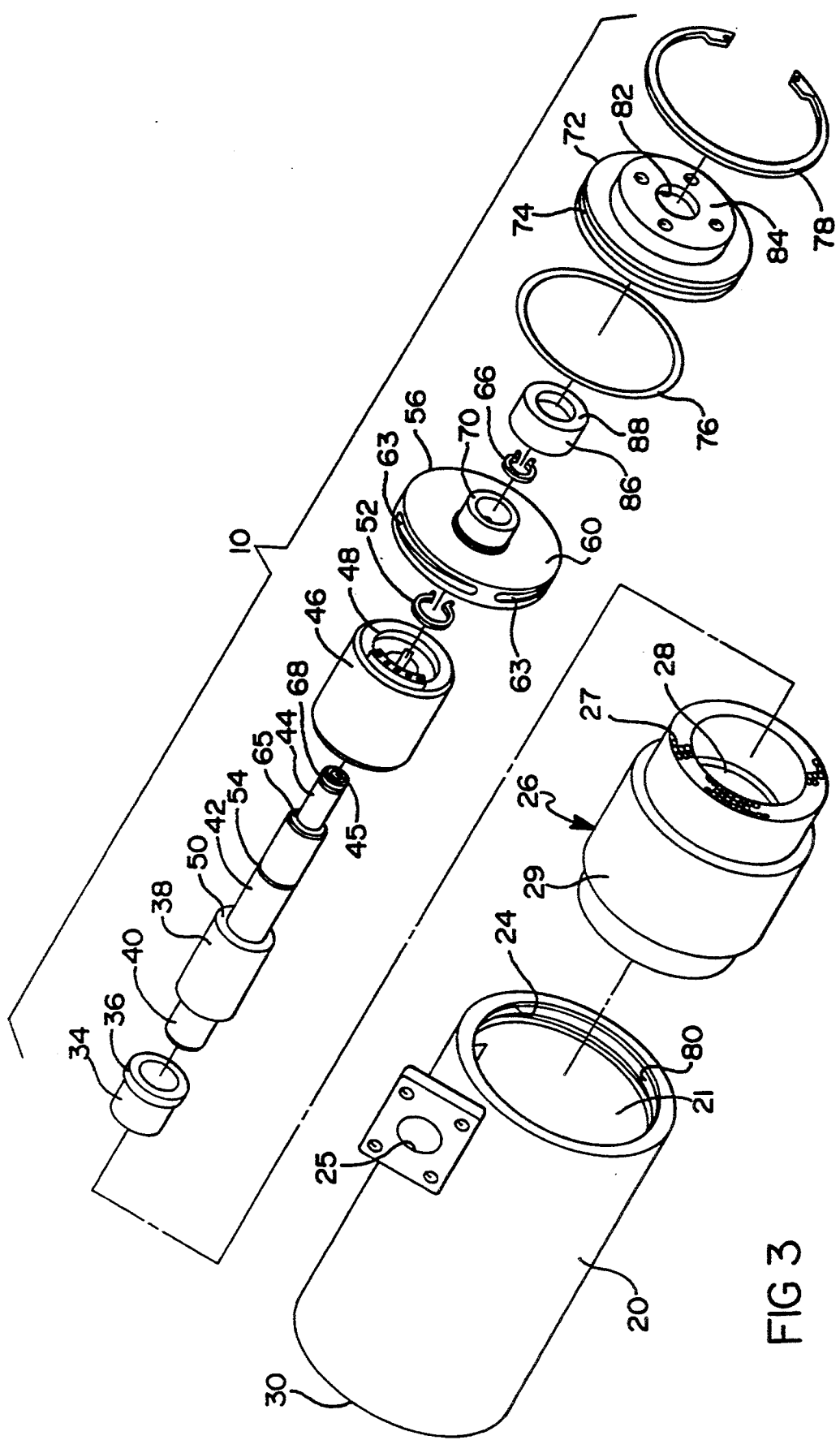
FIG. 3 is an exploded perspective view of the liquid refrigerant pump of FIGS. 1 and 2.

Referring to FIGS. 2 and 3, the liquid refrigerant pump 10 includes a housing 20 having a generally cylindrical shape to form a hollow interior 21 with rear and front open ends 22 and 24, respectively. The housing 20 also has an outlet 25 for allowing liquid refrigerant to exit from the interior 21. It should be appreciated that the outlet 25 is connected to the expansion valve 18.

The liquid refrigerant pump 10 also includes a stator 26, generally indicated at 26, mounted to the housing 20. The stator 26 has a plurality of windings 27 formed in an annular shape and extending axially to receive power from an electrical power source (not shown). The stator 26 also has inner and outer core members 28 and 29 surrounding an inner and outer periphery of the windings 27. The core members 28 and 29 are annularly shaped and extend axially. The core members 28 and 29 are made of a ferrous material. It should be appreciated that the windings 27 are insulated with a material that is chemically compatible with the refrigerant of the refrigeration system 10. For example, the magnet wires may be coated with a modified polyester overcoated with polyamide imide when used with pure refrigerants such as R22 or refrigerant/lubricant mixtures such as R22/mineral. Other specific materials may be used for the varnishes, sheet insulations, sleeving insulations, tapes, lead wire insulations and tie cords for the stator 26. Such a material is disclosed in the publication, "Compatibility of Refrigerants and Lubricants with Motor Materials", by Doerr and Kujak, ASHRAE Journal, August 1993, pgs. 42–47, the disclosure of which is hereby incorporated by reference.

The liquid refrigerant pump 10 also includes a rear end plate 30 to close the rear opening 22 of the housing 20. The rear end plate 30 is generally circular in shape and is secured to the housing 20 by suitable means such as welding. The rear end plate 30 has an axially extending projection 31 forming a cavity 32 therein for a function to be described. It should be appreciated that the housing 20 and rear end plate 30 may be integral and formed as one piece from a metal material such as, preferably, carbon steel.

The liquid refrigerant pump 10 also includes a rear bearing 34 disposed in the cavity 32 of the rear end plate 30. The rear bearing 34 is generally cylindrical in shape and has a flange 36 extending radially to abut the end of the projection 31.

The liquid refrigerant pump 10 includes a rotatable shaft 38 disposed within the housing 20. The shaft 38 is cylindrical in shape and extends axially. The shaft 38 has a reduced diameter bearing portion 40 at one end which is disposed within the rear bearing 34. The shaft 38 also has a reduced diameter first stepped portion 42 and a reduced diameter second stepped portion 44 at the other end for a function to be described. The shaft 38 has a passageway 45 extending axially therethrough to allow liquid refrigerant to cool the rear bearing 34. It should be appreciated that the bearing portion 40 rotates relative to the rear bearing 34.

The liquid refrigerant pump 10 also includes a rotor 46 which cooperates with the stator 26. The rotor 46 has a generally cylindrical shape and a flange 48 which extends radially inwardly and is disposed about the first stepped portion 42 of the shaft 38. The rotor 46 abuts a shoulder 50 of the shaft 38 and includes a snap ring 52 which is disposed in a groove 54 of the first stepped portion 42 to secure the rotor 46 against the shoulder 50 of the shaft 38 and prevent axial movement of the rotor 46 along the shaft 38. The rotor 48 is made of a metal material to rotate in response to the magnetic field produced by the windings 27. It should be appreciated that the stator 26 and rotor 46 form a motor for rotating the shaft 38 upon receiving electrical power.

The liquid refrigerant pump 10 includes a pump member or impeller 56 connected to the shaft 38. The impeller 56 has a generally cylindrical hub portion 58 disposed about the second stepped portion 44 and an impeller portion 60 extending radially from the hub portion 58. The impeller portion 60 includes at least one, preferably a plurality of internal passageways 62 which have an elongated opening 63 at the outer periphery of the impeller portion 60 and a circular opening 64 at the hub portion 58 for a function to be described. The impeller 56 abuts a shoulder 65 of the first stepped portion 42 and a snap ring 66 is disposed in a groove 68 of the second stepped portion 44 to secure the hub portion 58 against the shoulder 65 of the shaft 38 and prevent axial movement of the impeller 56 along the shaft 38. The impeller 56 also includes an axially extending projection 70 which forms a cavity 71 for a function to be described.

The liquid refrigerant pump 10 also includes a front end plate 72 to close the front opening 24 of the housing 20. The front end plate 72 is generally circular in shape and has a groove 74 in its outer periphery. A seal 76 such as an O-ring is disposed in the groove 74 to prevent liquid refrigerant from leaking past the outer periphery of the front end plate 72. A snap ring 78 is disposed in a groove 80 of the housing 20 to prevent axial movement of the front end plate 72 relative to the housing 20. The front end plate 72 also includes an opening 82 extending axially therethrough. The front end plate 72 has a flange 84 extending radially inwardly at the front of the opening 82 to form a shoulder.

The liquid refrigerant pump 10 further includes a front bearing 86 disposed in the opening 82 of the front end plate 72. The front bearing 86 is generally cylindrical in shape and has a flange 88 extending radially to abut the flange 84 of the front end plate 72. The projection 70 of the impeller 56 is disposed in the front bearing 86 and rotates relative thereto. It should be appreciated that the bearings 34 and 86 are made of a plastic or metal material which is softer than the shaft 38 and impeller 56. It should also be appreciated that the material for the bearings 34 and 86 are chemically compatible with the refrigerant of the refrigeration system 10.

In operation, liquid refrigerant flows from the receiver 17 through the opening 82 of the front end plate 72 and front bearing 86 into the cavity 71 of the impeller 56. Power from an electrical power source is applied to the windings 27 of the stator 26 which produces a magnetic field. The rotor 46 rotates in response to the magnetic field, in turn, rotating the shaft 38 and impeller 56. Rotation of the impeller 56 causes the liquid refrigerant to flow from the cavity 71 through the opening 64 and internal passageways 62 and opening 63 and increase in pressure. The pressurized liquid refrigerant flows from the openings 63 through the outlet 25 and to the expansion valve 18.

Accordingly, the liquid refrigerant pump 10 is hermetically sealed and the motor (stator 26 and rotor 46) are submersed in liquid refrigerant. The windings 27 of the motor are chemically compatible with the refrigerant unlike conventional motors. The liquid refrigerant pump 10 increases the pressure of the liquid refrigerant and does not require a magnetic seal between the stator 26 and rotor 46. The liquid refrigerant pump 10 is less expensive and more efficient than conventional can pumps.

The present invention has been described in an illustrative manner. It is to be understood that the terminology which has been used is extended to be in the nature of words of description rather than of limitation.

Many modifications and variations of the present invention are possible in light of the above teachings. Therefore, writing the scope of the appended claims, the present invention may be practiced otherwise than as specially described.

What is claimed is:

1. A liquid refrigerant pump comprising:

a housing having a hollow interior for receiving liquid refrigerant;

a motor disposed within said interior of said housing and connected to a source of power;

a rotatable impeller disposed within said interior of said housing and having an impeller cavity receiving liquid refrigerant;

a rotatable shaft interconnecting said motor and said impeller for rotating said impeller to increase the pressure of the liquid refrigerant upon said motor receiving electrical power, said rotatable shaft having a first passageway therein to allow liquid refrigerant to flow through said first passageway in a first path from said impeller cavity and said rotatable impeller having a second passageway therein to allow liquid refrigerant to be pumped through said second passageway in a second path from said impeller cavity, whereby the motor, rotatable shaft and rotatable impeller are submersed in liquid refrigerant in the housing;

said motor comprising a stator connected to said housing for producing a magnetic field and a rotor connected to said rotatable shaft for rotation in response to the presence of the magnetic field; and said stator comprising a plurality of windings having an outer coating which forms a barrier between liquid refrigerant and said windings and which is chemically compatible with the liquid refrigerant but which does not degrade the effect of the magnetic field generated by said windings.

2. A liquid refrigerant pump as set forth in claim 1 wherein said second passageway is at least one internal passage with an inlet opening at an inner periphery and an outlet opening at an outer periphery.

3. A liquid refrigerant pump as set forth in claim 2 wherein said outlet opening is elongated.

4. A liquid refrigerant pump as set forth in claim 1 including a rear end plate closing a rear opening of said interior.

5. A liquid refrigerant pump as set forth in claim 4 including a rear bearing interconnecting said rear end plate and said interconnecting means.

6. A liquid refrigerant pump as set forth in claim 1 including a front end plate closing a front opening of said interior.

7. A liquid refrigerant pump as set forth in claim 6 including a front bearing interconnecting said front end plate and said pump.

8. A liquid refrigerant pump for use in a refrigeration system to raise the pressure of a refrigerant and move the refrigerant along the refrigeration system, said liquid refrigerant pump comprising:

a pump housing defining a hollow interior having an inlet through which liquid refrigerant enters said pump housing at a first predetermined pressure and an outlet disposed spaced from said inlet from which liquid refrigerant leaves said pump housing at a higher second predetermined pressure;

an electrically actuated motor connected to a power source and disposed within said interior of said pump housing and exposed to the flow of liquid refrigerant through said pump housing between said inlet and said outlet;

an impeller rotatably disposed within said pump housing and having an impeller cavity receiving liquid refrigerant and powered by said motor to pump liquid refrigerant between said inlet and said outlet in said pump housing, whereby the motor and impeller are submersed in liquid refrigerant in the housing;

said motor including a stator fixedly mounted within said pump housing and having a plurality of windings for creating a magnetic field within said pump housing and a rotor rotatably supported within said pump housing and driven by the magnetic field;

a rotatable shaft interconnecting said rotor and said impeller and having a first passageway therein to allow liquid refrigerant to flow through said first passageway in a first path from said impeller cavity and said impeller having a second passageway therein to allow liquid refrigerant to be pumped through said second passageway in a second path from said impeller cavity; and said motor including an outer coating disposed about said windings which forms a barrier between liquid refrigerant and said windings and which is chemically compatible with the liquid refrigerant but which does not degrade the effect of the magnetic field generated by said windings.

9. Liquid refrigerant pump as set forth in claim 8 wherein said impeller is disposed about said shaft and extends radially outwardly from said shaft within said pump housing, said impeller having an inlet opening disposed at an inner periphery of said impeller approximate said shaft and an outlet opening disposed at an outer periphery and at least one said second passageway extending within said impeller and between said openings to which of the liquid refrigerant flows between said housing inlet and outlet.

10. A refrigeration system comprising:

at least an evaporator, a compressor, a condenser and a liquid refrigerant pump for raising the pressure of refrigerant and to move refrigerant along said refrigeration system;

said liquid refrigerant pump including a pump housing defining a hollow interior having an inlet through which liquid refrigerant enters said pump housing at a first predetermined pressure and an outlet disposed spaced from said inlet from which liquid refrigerant leaves said pump housing at a higher second predetermined pressure;

an electrically actuated motor connected to a power source and disposed within said interior of said pump housing and exposed to the flow of liquid refrigerant to said pump housing between said inlet and said outlet;

an impeller rotatably disposed within said pump housing and powered by said motor to pump liquid refrigerant between said inlet and said outlet in said pump housing, whereby the motor and impeller are submersed in liquid refrigerant in the housing;

said motor including a stator fixedly mounted within said pump housing and having a plurality of windings for creating a magnetic field within said pump housing and a rotor rotatably supported within said pump housing and driven by the magnetic field;

a rotatable shaft interconnecting said rotor and said impeller and having a first passageway therein to allow liquid refrigerant to flow through said first passageway in a first path from said impeller cavity and said impeller having a second passageway therein to allow liquid refrigerant to be pumped through said second passageway in a second path from said impeller cavity; and said motor including an outer coating disposed about said windings which forms a barrier between liquid refrigerant and said windings and which is chemically compatible with the refrigerant but which does not degrade the effect of the magnetic field generated by said windings.

* * * * *